(12) United States Patent
Inoue

(10) Patent No.: US 9,104,433 B2
(45) Date of Patent: Aug. 11, 2015

(54) TRACE GENERATION METHOD, TRACE GENERATION DEVICE, TRACE GENERATION PROGRAM PRODUCT, AND MULTI-LEVEL COMPILATION USING TRACE GENERATION METHOD

(71) Applicant: International Business Machines Corporation, Armonk, NY (US)

(72) Inventor: Hiroshi Inoue, Tokyo (JP)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 101 days.

(21) Appl. No.: 14/028,648

(22) Filed: Sep. 17, 2013

(65) Prior Publication Data

US 2014/0101643 A1 Apr. 10, 2014

(30) Foreign Application Priority Data

Oct. 4, 2012 (JP) ................................. 2012-222362

(51) Int. Cl.
G06F 9/45 (2006.01)

(52) U.S. Cl.
CPC .............. *G06F 8/443* (2013.01); *G06F 8/4441* (2013.01); *G06F 8/447* (2013.01)

(58) Field of Classification Search
CPC ........ G06F 8/443; G06F 8/4441; G06F 8/447
See application file for complete search history.

(56) References Cited

U.S. PATENT DOCUMENTS

| | | | |
|---|---|---|---|
| 6,381,739 B1 * | 4/2002 | Breternitz et al. ............... | 714/37 |
| 6,971,091 B1 | 11/2005 | Arnold et al. | |
| 7,140,008 B2 * | 11/2006 | Chilimbi et al. ............... | 717/158 |
| 7,386,686 B2 | 6/2008 | Wu et al. | |
| 8,612,952 B2 * | 12/2013 | Tzoref et al. .................... | 717/154 |
| 8,990,786 B2 * | 3/2015 | Nakaike .......................... | 717/139 |
| 2002/0092005 A1 * | 7/2002 | Scales ............................. | 717/162 |
| 2002/0144101 A1 * | 10/2002 | Wang et al. ..................... | 712/240 |
| 2004/0019886 A1 * | 1/2004 | Berent et al. ................... | 717/158 |
| 2004/0103401 A1 * | 5/2004 | Chilimbi et al. ............... | 717/130 |

(Continued)

OTHER PUBLICATIONS

Hiroshi Inoue, Hiroshige Hayashizaki, Peng Wu, and Toshio Nakatani, Adaptive multi-level compilation in a trace-based Java JIT compiler, [Online] Oct. 2012, SIGPLAN Not. 47, 10, [Retrieved from the Internet] <http://doi.acm.org/10.1145/2398857.2384630> pp. 179-194.*

(Continued)

*Primary Examiner* — Thuy Dao
*Assistant Examiner* — Ravi K Sinha
(74) *Attorney, Agent, or Firm* — Jeff Tang

(57) ABSTRACT

A trace generation device including a directed graph generator configured to generate a directed graph in accordance with execution of compiled traces whose maximum length is limited to a certain length or shorter and that have been generated at a low optimization level, the directed graph representing transitions of execution between the compiled traces; a directed graph updater configured to traverse edges in the directed graph backward from a start point in timer-based sampling, the start point being a node corresponding to a trace in which a timer tick has occurred, and configured to increment a recompilation counter of a trace that the backward traversal has reached when stopping in front of a cyclic trace or at a trace not having any further edge; and a generator configured to determine the head of a corresponding trace as a head of a new trace.

20 Claims, 12 Drawing Sheets

(56) References Cited

U.S. PATENT DOCUMENTS

| | | | |
|---|---|---|---|
| 2006/0095722 A1* | 5/2006 | Biles et al. | 712/34 |
| 2007/0226700 A1* | 9/2007 | Gal et al. | 717/128 |
| 2009/0089765 A1* | 4/2009 | Guo et al. | 717/144 |
| 2012/0159461 A1* | 6/2012 | Nakaike | 717/139 |
| 2012/0204164 A1* | 8/2012 | Castanos et al. | 717/153 |
| 2013/0205286 A1* | 8/2013 | Barraclough et al. | 717/151 |
| 2013/0290936 A1* | 10/2013 | Rhee et al. | 717/128 |

OTHER PUBLICATIONS

Andreas Gal, Christian W. Probst, and Michael Franz, HotpathVM: an effective JIT compiler for resource-constrained devices, [Online] 2006, In Proceedings of the 2nd international conference on Virtual execution environments (VEE '06). ACM, New York, NY, [Retrieved from the Internet] <http://doi.acm.org/10.1145/1134760.1134780> pp. 144-153.*

Gal et al., Trace-based just-in-time type specialization for dynamic languages, [Online] Jun. 2009, SIGPLAN Not. 44, 6, [Retrieved from the Internet] <http://doi.acm.org/10.1145/1543135.154252> pp. 465-478.*

Michael Bebenita, Florian Brandner, Manuel Fahndrich, Francesco Logozzo, Wolfram Schulte, Nikolai Tillmann, and Herman Venter. 2010. SPUR: a trace-based JIT compiler for CIL. SIGPLAN Not. 45, 10 (Oct. 2010), [Retrieved from the Internet] <http://doi.acm.org/10.1145/1932682.1869517> pp. 708-725.*

Larus, James R., and Satish Chandra, Using tracing and dynamic slicing to tune compilers, [Online] 1993, University of Wisconsin-Madison, Computer Sciences Department, [Retrieved from the Internet] <> 18 pages total.*

Bolz et al., Tracing the meta-level: PyPy's tracing JIT compiler, [Online] 2009, In Proceedings of the 4th workshop on the Implementation, Compilation, Optimization of Object-Oriented Languages and Programming Systems (ICOOOLPS '09). ACM, New York, NY, USA, <http://doi.acm.org/10.1145/1565824.1565827> pp. 18-25.*

Peng Wu et al., Reducing Trace Selection Footprint for Large-scale Java Applications without Performance Loss, ACM SIGPLAN Notices—OOPSLA '11, Oct. 10, 2011, pp. 789-804, vol. 46—Issue 10, ACM, New York NY USA.

Hiroshi Inoue et al., A Trace-based Java JIT Compiler Retrofitted from a Method-based Compiler, CGO '11 Proceedings of the 9th Annual IEEE/ACM International Symposium on Code Generation and Optimization, Apr. 2, 2011, pp. 246-256, IEEE Computer Society, Washington DC USA.

Hiroshige Hayashizaki et al., Improving the Performance of Trace-based Systems by False Look Filtering, ACM SIGARCH Computer Architecture News—ASPLOS '11, Mar. 1, 2011, pp. 405-418, vol. 39—Issue 1, ACM, New York NY USA.

Michael Paleczny, Christopher Vick and Cliff Click, The Java HotSpot Server Compiler, Proceedings of the Java Virtual Machine Research and Technology Symposium (JVM ' 01), Apr. 23, 2001, p. 1, USENIX Association, Monterey CA USA, website: https://www.usenix.org/legacy/events/jvm01/full_papers/paleczny/paleczny.pdf.

Nikola Grcevski et al., Java Just-In-Time Compiler and Virtual Machine Improvements for Server and Middleware Applications, Proceedings of the 3rd conference on Virtual Machine Research and Technology Symposium, May 6, 2004, p. 12, vol. 3, USENIX Association, Berkley CA USA. website: https://www.usenix.org/legacy/event/vm04/tech/full_papers/grcevski.pdf.

Toshio Suganuma et al., A Dynamic Optimization Framework for a Java Just-in-Time Compiler, ACM SIGPLAN Notices—OOPSLA '01, Nov. 1, 2001, pp. 180-195, vol. 36—Issue 11, ACM, New York NY USA.

Matthew Arnold et al., Adaptive Optimization in the Jalapeno JVM, ACM SIGPLAN Notices—OOPSLA '00, Oct. 10, 2000, pp. 47-65, vol. 35—Issue 10, ACM, New York NY USA.

Urs Holzle and David Ungar, A Third-Generation SELF Implementation: Reconciling Reponsiveness with Performance, ACM SIGPLAN Notices—OOPSLA '94 , Oct. 1994, pp. 229-243, ACM New York NY USA.

Todd Mytkowicz et al., Evaluating the Accuracy of Java Profilers, ACM SIGPLAN Notices—PLDI '10, Jun. 6, 2010, pp. 187-197, vol. 45—Issue 6, , ACM, New York NY USA.

Vasanth Bala, Evelyn Duesterwald and Sanjeev Banerjia, Dynamo: A Transparent Dynamic Optimization System, ACM SIGPLAN Notices—PLDI '00 Proceedings of the ACM SIGPLAN 2000 conference on Programming language design and implementation, May 5, 2000, pp. 1-12, vol. 35—Issue 5, ACM, New York NY USA, website: http://www.cs.tufts.edu/comp/150CMP/papers/bala00dynamo.pdf.

Martin Hirzel and Trishul Chilimbi, Bursty Tracing: A Framework for Low-Overhead Temporal Profiling, 4th ACM Workshop on Feedback-Directed and Dynamic Optimization '01 (FDDO) , Dec. 2001, pp. 117-126.

Christian Haubl and Hanspeter Mossenbock, Trace-based Compilation for the Java HotSpot Virtual Machine, 9th International Conference on the Principles and Practice of Programming in Java (PPPJ'11), Aug. 24, 2011, pp. 129-138, Kongens Lyngby Denmark.

Michael Bebenita et al., SPUR: A Trace-Based JIT Compiler for CIL, Microsoft Research Technical Report MSR-TR-2010-27, Mar. 26, 2010, pp. 1-17.

Michael Bebenita et al., Trace-Based Compilation in Execution Environments without Interpreters, Proceedings of the 8th international Conference on the Principles and Practice of Programming in Java—PPPJ '10, Sep. 15, 2010, pp. 59-68, ACM, New York, NY, 59-68.

* cited by examiner

FIG. 5
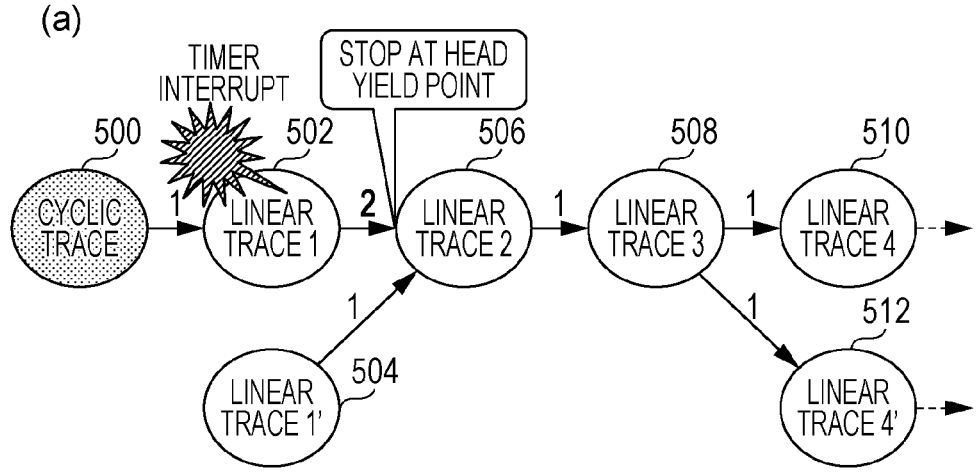
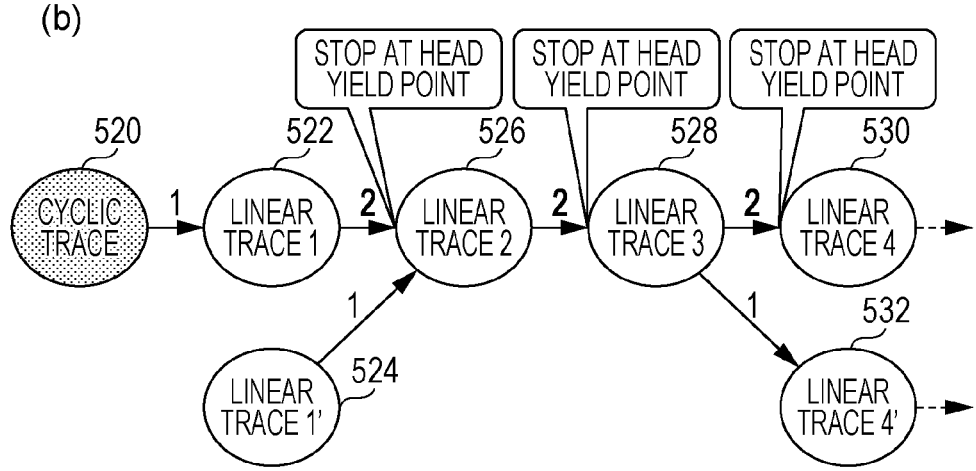

FIG. 13

```
timer interrupt foandfer() {
// this method is called when the timer interrupt occurs
 • set the yield flag of the current thread;
 • burstCounter = 0;
} yield point handler() {
// this method is called at a yield point if the yield flag is set
 • reset the yield flag of the current thresd;
if {the current yield point is at the head of a trace) {
    // Recompilation Based on TTgraph (see Section 3.4 for detail)
    if (burstCounter == 0) {// if this is the first yield point in this burst
       // charge the execution time to trace(s) based on the TTgraph
       • identify the trace(s) to charge the execution time by the backward traversal from the current trace;
       • increment the recompilation counter of the identified trace(s)
       • invalidate the trace(s) for recompilation if the recompilation counter exceeds the threshold;
    }

// Generating TTgraph (see Section 3.3 for detail)
    if (the previous trace can be identified by the link register value) {
       • Increment the weight of the TTgraph edge between the previous trace and the current trace;
       if (none of the burst termination conditions is satisfied) {
           // continue bursty tracing
           • set the yield flag of the current thread;
       }
    }

• burstCounter++;
}
else if (the current yield point is in a compiled trace) {// at a loop backedge
  • increment the recompilation counter of the current trace;
  • invalidate the current trace for recompilation if the recompilation counter exceeds the threshold;
  }
}
```

TRACE GENERATION METHOD, TRACE GENERATION DEVICE, TRACE GENERATION PROGRAM PRODUCT, AND MULTI-LEVEL COMPILATION USING TRACE GENERATION METHOD

CROSS-REFERENCE TO RELATED APPLICATION

This application claims priority under 35 U.S.C. §119 from Japanese Patent Application No. 2012-222362 filed Oct. 4, 2012, the entire contents of which are incorporated herein by reference.

BACKGROUND OF THE INVENTION

The present invention relates to trace-based compiler techniques, and more specifically to a multi-level compilation technique applied to trace-based compilers.

Hitherto, trace-based compilers that use frequently executed code sequences hereinafter, referred to as "traces", as basic units for compilation and execution have been known, for example, see P. Wu, H. Hayashizaki, H. Inoue, and T. Nakatani, "Reducing Trace Selection Footprint for Large-scale Java Applications with no Performance Loss", in Proceedings of the ACM Object-Oriented Programming, Systems, Languages & Applications, pp. 789-804, 2011, H. Inoue, H. Hayashizaki, P. Wu, and T. Nakatani, "A Trace-based Java JIT Compiler Retrofitted from a Method-based Compiler", in Proceedings of the International Symposium on Code Generation and Optimization, pp. 246-256, 2011, and H. Hayashizaki, P. Wu, H. Inoue, M. Serrano, and T. Nakatani, "Improving the Performance of Trace-based Systems by False Loop Filtering", In Proceedings of Sixteenth International Conference on Architectural Support for Programming Languages and Operating Systems, pp. 405-418, 2011.

Trace selection is an essential key for trace-based compilers. Generating longer traces increases the opportunities for compiler optimization and reduces the overhead of transitions between compiled traces. However, generating long traces often causes generation of duplicated traces. This increases the code size and the compilation time, and degrades the startup performance, for example, see Non-patent Literature 1.

Generating longer traces in trace-based compilers is similar to expanding the compilation scope by aggressively performing method inlining in method-based compilers. In systems using method-based just-in-time (JIT) compilers, adaptive multi-level compilation techniques are widely used in order to achieve both quick startup and high peak performance, for example see Michael Paleczny, Christopher Vick, and Cliff Click, "The Java Hotspot™ Server Compiler", in Proceedings of the USENIX Java Virtual Machine Research and Technology Symposium, pp. 1-12, 2001, N. Greevski, A. Kielstra, K. Stoodley, M. Stoodley, and V. Sundaresan, "Java just-in-time compiler and virtual machine improvements for server and middleware applications", In Proceedings of the USENIX Virtual Machine Research and Technology Symposium, pp. 151-162, 2004, T. Suganuma, T. Yasue, M. Kawahito, H. Komatsu, and T. Nakatani, "A dynamic optimization framework for a Java just-in-time compiler", in Proceedings of the ACM Conference on Object-Oriented Programming Systems, Languages, and Applications, pp. 180-195, 2001, M. Arnold, S. Fink, D. Grove, M. Hind, and P. F. Sweeney, "Adaptive optimization in the Jalapeno JVM", in Proceedings of the ACM SIGPLAN conference on Object-oriented programming, systems, languages, and applications, pp. 47-65, 2000, U. Holzle and D. Ungar, "A third generation self implementation: Reconciling responsiveness with performance", in Proceedings of the ACM conference on Object-Oriented Programming, Systems, Languages, and Applications, pp. 229-243, 1994, and U.S. Pat. No. 7,386,686.

In adaptive multi-level compilation techniques, compilation is performed at a low optimization level during startup of a program. After the startup ends, methods that use more execution time are found through profiling and then recompilation is performed on the methods at a higher optimization level. It is desired that trace-based compilers also perform multi-level compilation to increase both startup speed and peak performance.

In the list of related-art literatures below, V. Bala, E. Duesterwald, and S. Banerjia, "Dynamo: A Transparent Runtime Optimization System", in Proceedings of the ACM Programming Language Design and Implementation, pp. 1-12, 2000 is listed as the background art regarding an optimization technique that links traces with each other, trace linking optimization, which is used in an embodiment of the present invention.

Also, M. Hirzel and T. M. Chilimbi, "Bursty tracing: a framework for low-overhead temporal profiling", in Proceedings of the 4th Workshop on Feedback-Directed and Dynamic Optimization, pp. 117-126, 2001 is listed as the background art regarding a bursty tracing technique from which a technique used in the embodiment of the present invention is derived. In addition, M. Hirzel and T. M. Chilimbi, "Bursty tracing: a framework for low-overhead temporal profiling", in Proceedings of the 4th, Workshop on Feedback-Directed and Dynamic Optimization, pp. 117-126, 2001, M. Bebenita, F. Brandner, M. Fahndrich, F. Logozzo, W. Schulte, N. Tillmann, and H. venter, "SPUR: A trace-based JIT compiler for CIL", in Proceedings of the ACM international conference on Object oriented programming systems languages and applications, pp. 708-725, 2010, and M. Bebenita, M. Chang, G. Wagner, A. Gal, C. Wimmer, and M. Franz, "Trace-based compilation in execution environments without interpreters", in Proceedings of the 8th International Conference on the Principles and Practice of Programming in Java, pp. 59-68, 2010 are listed as existing tracing techniques that support recompilation.

However, unlike the present invention, recompilation described in C. Haubl et al., is recompilation for correcting frequently aborting traces and is not upgrade recompilation. Also, the initial compilation described in Non-patent Literatures M. Bebenita et al. and M. Bebenita et al. is performed to compile code inserted for execution monitoring. Recompilation described in these literatures is equivalent to ordinary compilation and is not upgrade recompilation, unlike the present invention.

SUMMARY OF THE INVENTION

In order to use multi-level compilation techniques in trace-based compilers, it is necessary to generate long traces and obtain a larger compilation scope at the time of recompilation. However, unlike method-based compilers that use methods as basic units for compilation, trace generation has a high degree of freedom in terms of the start point and the end point of the compilation scope. Therefore, merely relaxing the restraint on the maximum length of traces leads to generation of duplicated traces or traces having an inappropriate start point as described above.

Accordingly, one aspect of the present invention provides a trace generation method implemented by a computer, including the steps, executed by the computer, of generating a directed graph in accordance with execution of compiled traces that have been obtained by compiling traces whose maximum length is limited to a certain length or shorter, the directed graph representing transitions of execution between the compiled traces, each node that represents a corresponding one of the compiled traces having a recompilation counter, traversing edges in the directed graph backward from a start point in timer-based sampling performed during execution of the compiled traces, the start point being a node corresponding to a trace in which a timer tick has occurred, and incrementing the recompilation counter of a trace that the backward traversal has reached when stopping in front of a cyclic trace or a recompiled trace or at a trace not having any further edge, and determining the head of a trace corresponding to a node having the recompilation counter whose value exceeds the first threshold as a head of a new trace if a value of any of the recompilation counters exceeds a first threshold permitting generation of a trace that is longer than the certain length, and generating the new trace.

Another aspect of the present invention provides a multi-level compilation execution method implemented by a computer, including the steps, executed by the computer, of compiling traces generated while limiting the maximum length of the traces to a certain length or shorter, acquiring a result of executing the generated compiled traces, and executing each step of the trace generation method on the acquired execution result and recompiling the new trace generated as a result.

Another aspect of the present invention provides a trace generation device which includes a directed graph generator configured to generate a directed graph in accordance with execution of compiled traces that have been obtained by compiling traces whose maximum length is limited to a certain length or shorter, the directed graph representing transitions of execution between the compiled traces, each node that represents a corresponding one of the compiled traces having a recompilation counter, a directed graph updater configured to traverse edges in the directed graph backward from a start point in timer-based sampling performed during execution of the compiled traces, the start point being a node corresponding to a trace in which a timer tick has occurred, and configured to increment the recompilation counter of a trace that the backward traversal has reached when stopping in front of a cyclic trace or a recompiled trace or at a trace not having any further edge, and a generator configured to, if a value of any of the recompilation counters exceeds a first threshold, determine the head of a trace corresponding to a node having the recompilation counter whose value exceeds the first threshold as a head of a new trace, permit generation of a trace that is longer than the certain length, and generate the new trace.

Another aspect of the present invention provides a multi-level compilation device including a compiler configured to compile traces generated while limiting the maximum length of the traces to a certain length or shorter; and the trace generation device wherein the device is configured to receive a result of executing the compiled traces, wherein the compiler recompiles the new trace output by the trace generation device.

BRIEF DESCRIPTION OF THE DRAWINGS

FIG. 5(a) is a diagram describing a method for updating the weight of an edge in a TTgraph.

FIG. 5(b) is a diagram describing another method for updating the weight of an edge in a TTgraph.

FIG. 13 is a diagram illustrating an example of pseudocode representing generation of a TTgraph and recompilation based on the TTgraph.

DETAILED DESCRIPTION OF THE PREFERRED EMBODIMENTS

Figure 1:
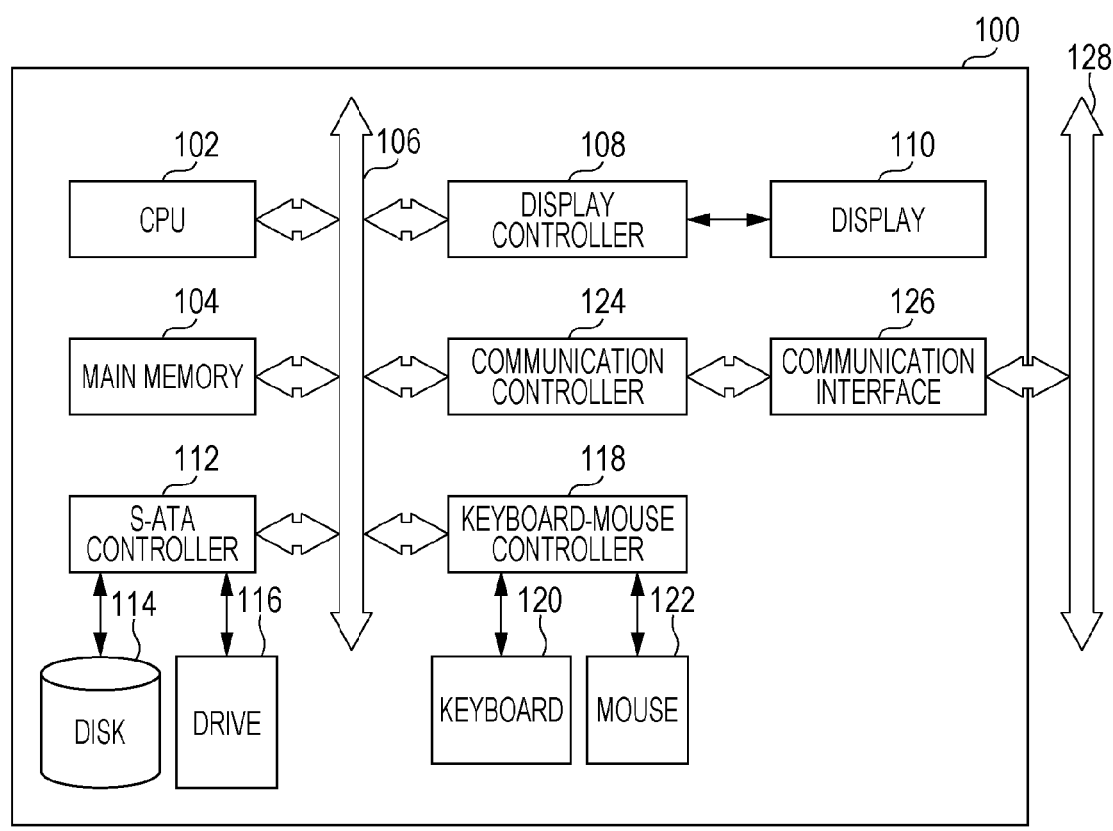
FIG. 1 is a diagram illustrating an example of the hardware configuration of a computer system 100 suitable for implementing a trace generation device and a multi-level compilation device according to an embodiment of the present invention.

Method-based compilers use timer-based sampling in order to find frequently executed methods, for example see U.S. Pat. No. 6,971,091 and T. Mytkowicz, A. Diwan, M. Hauswirth, and P. F. Sweeney, "Evaluating the accuracy of Java profilers", in Proceedings of the ACM SIGPLAN conference of Programming language design and implementation, pp. 187-197, 2010. In the timer-based sampling, the compilers insert yield points, otherwise known as async check points, at the head of each method and loop back edges to stop execution at safe locations. If a timer interrupt occurs during execution, a flag is set to indicate that a thread needs to stop upon reaching the next yield point. In the case where the location where the thread has stopped is a yield point inserted at the head of a method, a first stack walk is performed to identify a caller of the method. Then, the execution time is charged because it is considered that a timer tick has occurred in the caller. Also, as for methods including neither method calls nor loops, a yield point is inserted at the method exit location, otherwise known as a return, so as to avoid a situation where a timer is not set for the methods at all.

Trace-based compilers can use the timer-based sampling to find frequently executed linear execution paths. However, when yield points are inserted at trace exit points, the number of inserted yield points becomes large because the exit point exists for each conditional branch, and consequently the code size increases. In addition, because trace-based execution never returns to the original location, the trace executed immediately before the trace in which execution has stopped is unable to be found with a measure, such as the stack walk. As a result, the execution time is not appropriately charged.

The present invention is made to address the issues described above and aims to provide a technique capable of implementing multi-level compilation in trace-based compilers. The present invention also aims to provide a technique capable of finding traces that consume more execution time by using timer-based sampling, while avoiding generating duplicated traces and more desirably avoiding increasing the code size.

In order to address the issues described above, according to one aspect of the present invention, there is provided a following trace generation method implemented by a computer. The trace generation method includes the steps, executed by the computer, of: (a) generating a directed graph, hereinafter referred to as a trace transition graph (TTgraph), in accordance with execution of compiled traces that have been obtained by compiling traces whose maximum length is limited to a certain length or shorter, the TTgraph representing transitions of execution between the compiled traces, each node that represents a corresponding one of the compiled traces having a recompilation counter; (b) traversing edges in the TTgraph backward from a start point in timer-based sampling performed during execution of the compiled traces, the start point being a node corresponding to a trace in which a timer tick has occurred, and incrementing the recompilation counter of a trace that the backward traversal has reached when stopping in front of a cyclic trace or a recompiled trace or at a trace not having any further edge; and (c) if a value of any of the recompilation counters exceeds a first threshold, determining the head of a trace corresponding to a node having the recompilation counter whose value exceeds the first threshold as a head of a new trace, permitting generation of a trace that is longer than the certain length, and generating the new trace.

Preferably, each of the compiled traces has one or more yield points inserted at an entry point of the trace and a loop back edge, the yield points being used to find a trace in which the timer tick has occurred.

Preferably, each of the edges in the TTgraph has a weight that represents a relative frequency of a transition represented by the edge. The trace generation method further includes the step, executed by the computer, of: (d) incrementing the weight of an edge between a trace in which a timer tick has occurred and a trace executed immediately before the trace in which the timer tick has occurred. In the step (b), the computer increments the recompilation counter of a trace reached as a result of traversing an edge whose weight satisfies a certain condition.

In a case where a node encountered during the backward traversal of the directed graph has a plurality of incoming edges, the edge whose weight satisfies the certain condition is an edge for which a ratio of a weight of this incoming edge to the sum of weights of the plurality of incoming edges exceeds a second threshold.

In the case where a node to be traversed next has a plurality of outgoing edges, the edge whose weight satisfies the certain condition is an edge for which a ratio of a weight of this outgoing edge from the current node to the next node to the sum of weights of the plurality of outgoing edges exceeds a third threshold.

More preferably, the step (d) includes the step, executed by the computer, of making a setting for successively stopping execution at yield points inserted in one or more traces that follow a trace in which the timer tick has occurred in the TTgraph. The setting for successively stopping execution is disabled in response to the execution reaching any of a cyclic trace, a trace in which the execution has already stopped, and a recompiled trace, in response to the execution having successively stopped a certain number of times, or in response to the execution exiting from a trace for which there is no subsequent trace.

Preferably, each of the compiled traces has an instruction inserted therein, the instruction being an instruction to record a pointer pointing to the instruction, execution of which triggers an exit from the compiled trace. The step (d) includes the step, executed by the computer, of in response to the execution stopping at a yield point inserted at the entry point of the next compiled trace, identifying a trace executed immediately before the next compiled trace by referring to a value of the recorded pointer pointing to the instruction.

Moreover, according to another aspect of the present invention, there is provided a following multi-level compilation execution method implemented by a computer. The multi-level compilation execution method includes the steps, executed by the computer, of: (a) compiling traces generated while limiting the maximum length of the traces to a certain length or shorter; (b) acquiring a result of executing the generated compiled traces; (c) executing each step of any one of the trace generation methods described above on the acquired execution result; and (d) recompiling the new trace generated as a result of the step (c).

While the trace generation method and the multi-level compilation execution method have been described as the present invention above, the present invention can be regarded as a trace generation program product and a multi-level compilation execution program product that cause a computer to execute each step of the above-described trace generation method and the above-described multi-level compilation execution method, respectively. Also, the present invention can be regarded as a trace generation device and a multi-level compilation execution device that are implemented as a result of the trace generation program product and the multi-level compilation execution program being installed into one or more computers, respectively.

According to the present invention, a TTgraph representing transitions of execution between traces is generated using timer-based sampling and the execution time is charged for an appropriate trace on the basis of the generated TTgraph. This enables really hot longer traces with less duplication to be found. Also, the use of the TTgraph enables selection of traces that consume more execution time. This allows trace-based compilers to perform multi-level compilation and consequently to achieve both quick startup and high peak performance. Other advantageous effects of the present invention will be understood from description of each embodiment.

An embodiment for carrying out the present invention will be described in detail below in accordance with the drawings. The embodiment below does not limit the invention according to the claims. Also, all combinations of features described in the embodiment are not necessarily mandatory in solutions provided by the invention. Note that similar components are assigned similar reference numbers throughout the description of the embodiment.

FIG. 1 illustrates an example of the hardware configuration of a computer system 100 suitable for implementing the present invention. The computer system 100 includes a central processing unit (CPU) 102 and a main memory 104, which are connected to a bus 106. The CPU 102 is preferably based on the 32-bit or 64-bit architecture. For example, the Core i (trademark) series, the Core 2 (trademark) series, the Atom (trademark) series, the Xeon (trademark) series, the Pentium (registered trademark) series, or the Celeron (registered trademark) series of Intel Corporation or the Phenom (trademark) series, the Athlon (trademark) series, the Turion (trademark) series, or Sempron (trademark) of Advanced Micro Devices, Inc. can be used. The main memory 104 can preferably have a capacity of 1 GB or larger and can more preferably have a capacity of 2 GB or larger.

A display 110, for example, a liquid crystal display (LCD), can be connected to the bus 106 via a display controller 108. The display 110 is used to display information about a computer connected to a network via a communication line and information about software running on the computer using an appropriate graphical interface, for management of the computer.

A disk 114, for example, a silicon disk or a hard disk, can also be connected to the bus 106 via an S-ATA or IDE controller 112. In addition, a drive 116, for example, a Compact Disc (CD) drive, a Digital Versatile Disc (DVD) drive, or a Blu-ray Disc (BD) drive, can be optionally connected to the bus 106 via the S-ATA or IDE controller 112. Moreover, a keyboard 120 and a mouse 122 can be optionally connected to the bus 106 via a keyboard-mouse controller 118 or a USB bus (not illustrated). However, the keyboard 120 and the mouse 122 are not needed for carrying out the present invention.

The disk 114 stores the operating system, a Java (registered trademark) processing environment such as J2EE, Java (registered trademark) applications, programs providing a Java (registered trademark) virtual machine (VM), and other programs and data, so that the stored materials can be loaded to the main memory 104.

The operating system can be, for example, the LINUX (registered trademark), the Windows (registered trademark) operating system provided by Microsoft Corporation, the MacOS (registered trademark) or iOS (registered trademark) provided by Apple Inc., or the UNIX (registered trademark) based system including the X Window System (for example, AIX (registered trademark) provided by International Business Machines Corporation (registered trademark)).

The disk 114 can further store computer programs that operate in cooperation with the operating system to give instructions to the CPU 102 and to carry out the present invention. Specifically, the disk 114 can store a trace generation program that is installed into the computer system 100 and causes the computer system 100 to function as a trace generation device according to the embodiment of the present invention, a multi-level compilation execution program that causes the computer system 100 to function as a multi-level compilation execution device according to the embodiment of the present invention, and related data thereof. Note that the multi-level compilation execution program can be implemented by partially correcting a Java (registered trademark) runtime (JIT) compiler so that the compiler is able to execute multi-level compilation on the basis of traces generated by the trace generation device.

The trace generation program includes a TTgraph generation module, a TTgraph updating module, a trace generation module, and a trace cache. These program and modules cause the CPU 102 to operate so as to cause the computer system 100 to function as a TTgraph generator 220, a TTgraph updater 221, a trace generator 222, and a trace cache 224, each of which will be described later. Also, the multi-level compilation execution program includes an intermediate code generation module, an optimization module, and a code generation module. These program and modules cause the CPU 102 to operate so as to cause the computer system 100 to function as an intermediate code generator 230, an optimizer 232, and a code generator 234, each of which will be described later.

The above-described computer programs can be compressed and divided into a plurality of portions and the plurality of portions can be recoded on a plurality of media. The drive 116 can be used to install a program into the disk 114 from a CD-ROM, a DVD-ROM, or a BD, if necessary.

A communication interface 126 is compliant with, for example, the Ethernet (registered trademark) protocol. The communication interface 126 is connected to the bus 106 via a communication controller 124, functions to physically connect the computer system 100 to a communication line 128, and provides the network interface layer of the TCP/IP communication protocol of the communication function provided by the operating system of the computer system 100. The communication line 128 can be based on a wired local area network (LAN) environment or a wireless LAN environment, for example, the Wireless Fidelity (Wi-Fi) standard, such as IEEE 802.11a/b/g/n.

It can be understood from the above description that the computer system 100 used in the embodiment of the present invention is not limited to a specific operating system environment. Note that the above-described components are merely examples and are not necessarily mandatory components of the present invention.

Figure 2:
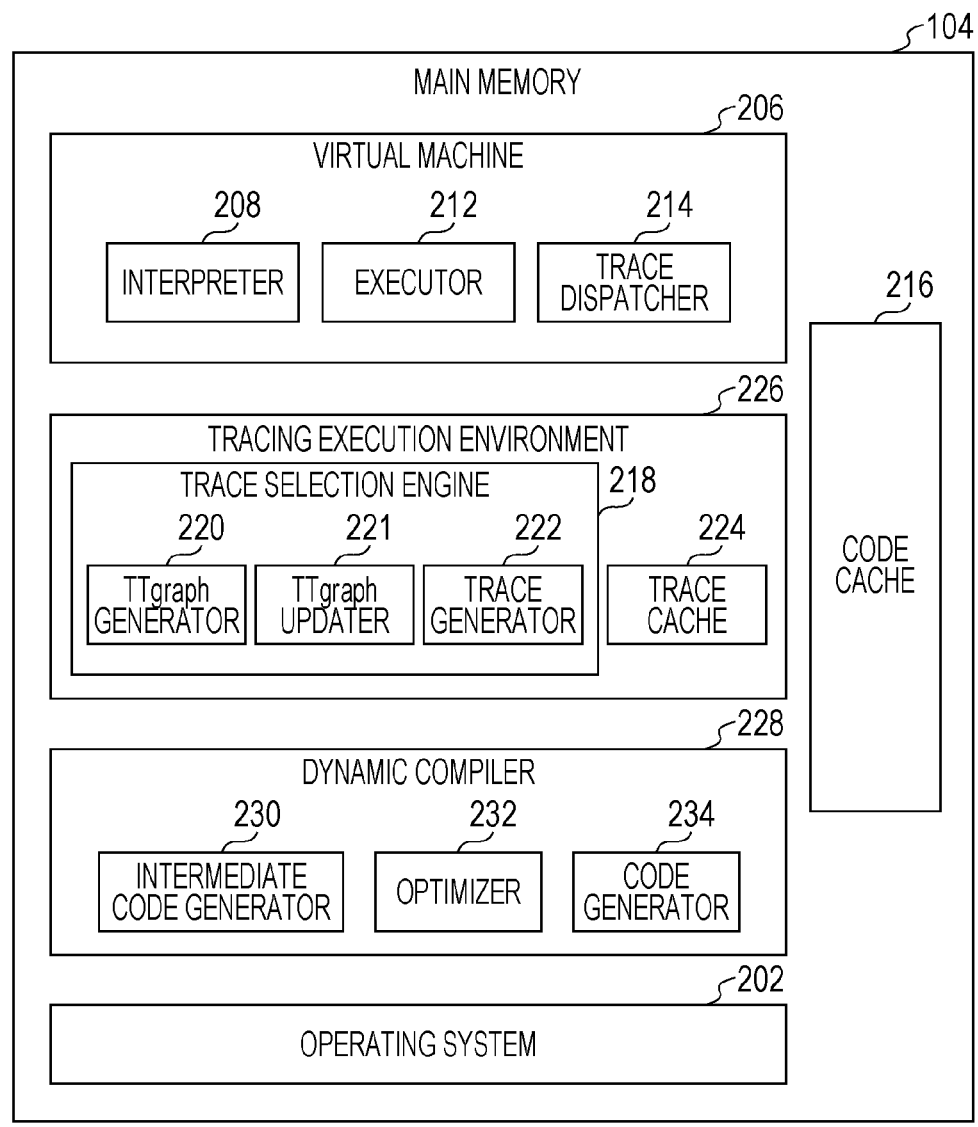
FIG. 2 is a diagram illustrating an example of the software configuration of the computer system 100 illustrated in FIG. 1.

FIG. 2 is a diagram illustrating an example of the software configuration of the computer system 100 illustrated in FIG. 1. The CPU 102 reeds out the Java (registered trademark) virtual machine (VM) and the trace generation program and the multi-level compilation execution program according to the embodiment of the present invention from the disk 114 to the main memory 104 and executes them, thereby developing an operating system 202, a virtual machine 206, a tracing execution environment 226, and a dynamic compiler 228 in the main memory 104. The operating system 202 is software that provides basic functions of the computer system 100, such as management of the CPU 102 and the main memory 104.

The virtual machine 206 is an emulator that executes (interprets) bytecode at a low speed and executes compiled traces. The virtual machine 206 includes an interpreter 208, an executor 212, and a trace dispatcher 214.

The trace dispatcher 214 refers to the trace cache 224 and determines whether or not a compiled trace starting from an address of bytecode to be executed next is stored in a code cache 216. The interpreter 208 executes processing target bytecode at a low speed when there is no compiled trace. The code cache 216 is a memory area that stores compiled traces generated by the dynamic compiler 228. The executor 212 acquires, when there is a compiled trace, the compiled trace from the code cache 216 and executes the compiled trace.

The tracing execution environment 226 is a group of software modules used to select, as a compilation target, a trace that uses more execution time (hereinafter, this trace is also referred to as a "hot path") under constraints regarding the current maximum length, in accordance with the bytecode execution result obtained by the interpreter 208 and the compiled trace execution result obtained by the executor 212. The tracing execution environment 226 includes a trace selection engine 218 and the trace cache 224. At a low optimization level used during startup, the trace selection engine 218 selects traces while limiting the maximum length of traces to a certain length or shorter. At a high optimization level used after startup ends, the trace selection engine 218 permits generation of traces that are longer than the certain length and newly selects traces. The trace cache 224 stores trace management information, such as the optimization level used during compilation and the data structure of a TTgraph generated by the TTgraph generator 220, which will be described later.

The present invention generates a TTgraph, which is a directed graph representing transitions of execution between traces, in order to find frequently executed linear execution paths through timer-based sampling at a higher optimization level used after startup ends. The execution time is charged for appropriate traces by using the TTgraph, whereby traces that consume more execution time are found while avoiding generation of duplicated traces. Accordingly, the trace selection engine 218 according to the present invention includes the TTgraph generator 220, the TTgraph updater 221, and the trace generator 222. Details about functions of these three components will be described later with reference to FIGS. 4 to 9.

The dynamic compiler 228 is a compiler that adopts multi-level compilation, in which compilation is performed at a low optimization level during startup to prioritize the startup speed and compilation is performed at a higher optimization level after startup ends to prioritize the peak performance. The dynamic compiler 228 receives a trace output from the trace selection engine 218, performs optimization at an optimization level corresponding to the constraints imposed on the received trace, and dynamically generates native code. The dynamic compiler 228 includes the intermediate code generator 230, the optimizer 232, and the code generator 234.

The intermediate code generator 230 converts a trace output by the trace selection engine 218 into an intermediate representation handled within the dynamic compiler 228. The optimizer 232 performs low-level optimization processing on a trace having a length equal to or shorter than the certain length during startup, and outputs the result to the code generator 234. The optimizer 232 also performs higher level optimization processing on a trace selected as a result of the length longer than the certain length being permitted after startup has ended, and outputs the result to the code generator 234 to perform upgrade recompilation. The code generator 234 converts the optimized trace output from the optimizer 232 into native code and stores the resulting native code in the code cache 216.

In the following, referring first to FIG. 3, timer-based sampling and a yield point used therein will be described. Subsequently, referring to FIGS. 4 to 9, generation and updating of a TTgraph and recompilation based on the TTgraph will be described. Thereafter, referring to FIGS. 10 to 13, a flow of overall multi-level compilation processing which includes processing for generating and updating of a TTgraph will be described. Lastly, referring to FIGS. 14 to 16, results of experiments in which the present invention is compared with known techniques will be described.

1. Timer-Based Sampling and Yield Point

In timer-based sampling, when a timer interrupt occurs during execution of compiled code, a thread-local flag called the yield flag is set to indicate that this thread needs to stop at the next yield point. When execution stops at the next yield point, it is considered that the execution time is used by a corresponding method and the execution time is charged for the corresponding method. As described above, the use of yield points allows the runtime system to safely stop the thread and to identify an exact program location where a timer tick has occurred. Thus, insertion locations of yield points determine the accuracy and overhead of profiling, see for example, T. Mytkowicz et al. for details.

Now, the use of timer-based sampling in trace-based compilers will be discussed. To exactly identify a trace being executed when the timer interrupt has occurred, yield points need to be inserted at the entry point of each trace and all exit points of the trace. When yield points are inserted at all exit points, the number of inserted yield points becomes large and consequently the code size increases because the exit point is present for each conditional branch as already described. Accordingly, based on the fact that most exit points do not trigger charging of the execution time, the present invention inserts yield points only at the head of each trace and loop back edges.

Figure 3:
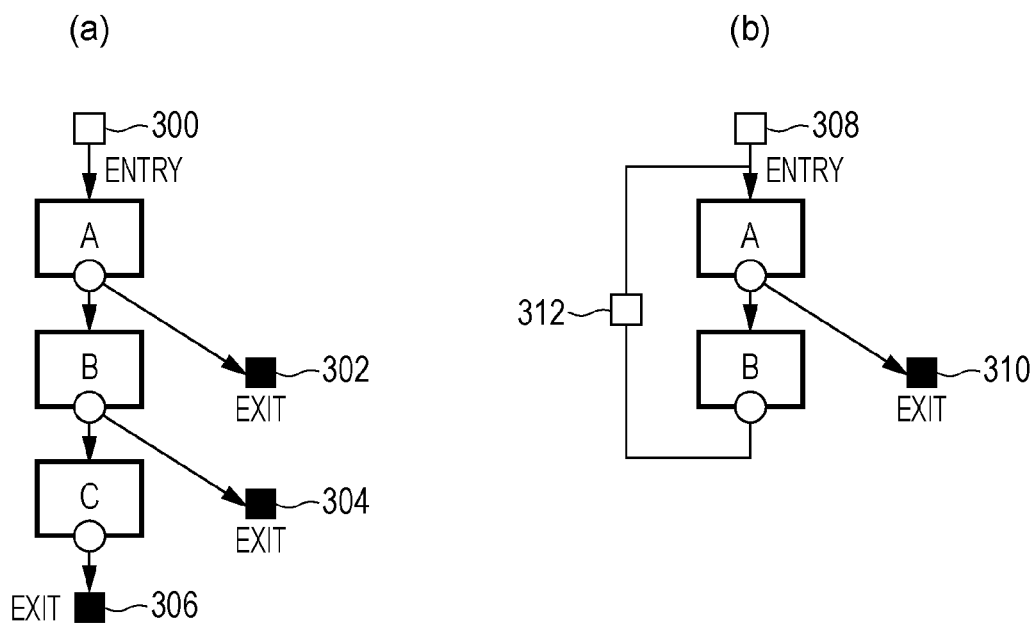
FIG. 3(a) is a diagram describing a yield-point insertion location in a linear trace.
FIG. 3(b) is a diagram schematically illustrating yield-point insertion locations in a cyclic trace.

FIG. 3(*a*) is a diagram describing a yield-point insertion location in a linear trace. The linear trace illustrated in FIG. 3(*a*) is constituted by basic blocks A, B, and C. In order to correctly handle the timer tick, yield points need to be inserted at an entry point 300 of the trace and all exit points 302, 304, and 306 of the trace. However, in the present invention, based on the above-mentioned fact, the yield point is inserted only at the entry point 300 of the trace, thereby avoiding code size bloat.

FIG. 3(*b*) is a diagram describing yield-point insertion locations in a cyclic trace. The cyclic trace illustrated in FIG. 3(*b*) is constituted by basic blocks A and B. In order to correctly handle the timer tick, yield points need to be inserted at an entry point 308 of the trace, a loop back edge 312, and an exit point 310 of the trace. However, in the present invention, based on the above-mentioned fact, the yield points are inserted only at the entry point 308 of the trace and the loop back edge 312, thereby avoiding code size bloat. Note that traces used as units for compilation in this embodiment are linear and cyclic traces, each of which is a block having one entry point and one or more exit points as illustrated in FIGS. 3(*a*) and 3(*b*).

In the present invention, instead of yield points inserted at exit points of each trace, a branch-and-link instruction is inserted as an instruction that is executed last within the trace, so that a pointer pointing to the instruction, execution of which triggers an exit from the current trace, is recorded in a link register. This enables identification of a trace executed immediately before the trace by referring to the value stored in the link register even when execution stops due to the timer interruption at a yield point inserted at the entry point of the next trace. Method-based compilers always charge the execution time for the trace executed immediately before execution stops at the yield point inserted at the entry point of the next trace. In contrast, the tracing execution environment 226 according to the present invention determines an appropriate trace for which the execution time is to be charged on a case-by-case basis using the TTgraph in order to find the entire hot path, which will be described in detail later.

The above-mentioned branch-and-link instruction is a jump instruction just like the normal branch instruction but stores a jump source address in a dedicated register called link register when it makes a jump. In general, the branch-and-link instruction is used to call a method, and the address stored in the link register is referred to when the process returns from the called method. This embodiment uses the branch-and-link instruction, instead of the branch instruction, when linking traces by using the trace linking technique, thereby enabling identification of the trace executed immediately before the current trace.

The trace linking technique is an optimization technique used to change the executed trace directly to the next trace without via the interpreter 208. In order to enable trace linking, code that causes a jump from the exit point of the previous trace directly to the head address of the next trace needs to be generated and inserted in the previous trace. For this end, the branch instruction to the trace dispatcher 214 is generally inserted at the end of execution code during compilation. If a condition that the next trace is uniquely determined is satisfied, the trace dispatcher 214 rewrites the jump destination of the branch instruction to the head address of the next trace when the compiled previous trace is executed for the first time after the previous and next traces, that is, the jump source and destination traces, were compiled. As described above, in this embodiment, the destination address is rewritten when traces are linked with each other by using the branch-and-link instruction instead of the branch instruction so that a jump to the head address of the next trace is made. Trace linking is an existing technique and is not the gist of the present invention. Thus, further description thereof will be omitted. Refer to, for example, Non-patent Literature 10 for further details about trace linking.

2. Generation of TTgraph

The TTgraph generator 220 performs profiling using timer-based sampling during execution of compiled traces, which have been compiled with their maximum length limited to the certain length or shorter, so as to generate a TTgraph. A TTgraph is a directed graph representing transitions of execution between traces. Each node in the directed graph represents a trace, whereas each edge between nodes represents a transition of execution between traces. Each node has a recompilation counter, which represents a frequency at which the timer tick has occurred for the node. Each edge has a weight, which represents a relative frequency of a corresponding transition between traces.

By way of example, the TTgraph can be stored in a data structure that holds the following pieces of information "a" to "c" for each node in the TTgraph.

a. The counter (hereinafter, referred to as a "recompilation counter") that counts the number of times the timer tick has occurred
b. For each incoming edge, {the source node, the edge weight counter}
c. For each outgoing edge, {the destination node, the edge weight counter}

Here, each node can be identified by a pointer pointing to the data structure that manages information about the trace represented by the node. In the case where the number of edges incoming to or outgoing from one node is large, only information about higher-ranked edges having greater weight counter values can be held and the weight counter values of the rest of the edges can be collectively counted as a weight counter value of the other edges. With this configuration, a memory consumption issue is avoided even if nodes with a large number of edges increase.

The TTgraph is generated in the following manner. First, many short traces are generated while limiting the maximum length of traces, which are units for compilation, to a certain length or shorter during startup of a program. Then, nodes of the directed graph that correspond to the generated traces are generated. Note that the above-described pieces of information "a" to "c" held for each node are empty at this point. Subsequently, the many generated traces are compiled at a low optimization level. At this time, yield points are inserted at the trace head and loop back edges.

Next, the executor 212 executes the compiled traces. In response to trace linking performed by the trace dispatcher 214, the TTgraph generator 220 generates an edge between the corresponding nodes in the TTgraph. More specifically, the destination node of the information c is set for the node corresponding to the source node, whereas the source node of the information b is set for the node corresponding to the current trace. Also, the weight counter of each corresponding edge is initialized to 1. In this manner, an edge is generated between the previous trace and the next trace.

Figure 4:
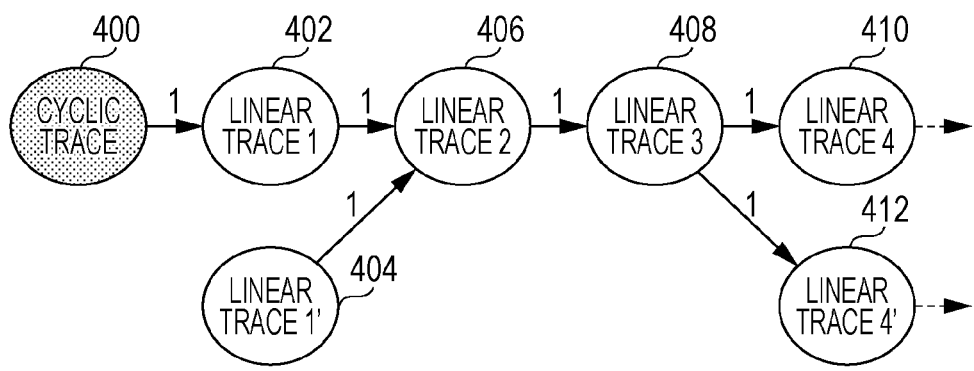
FIG. 4 is a diagram illustrating an example of a TTgraph.

FIG. 4 is a diagram illustrating an example of the basic structure of the TTgraph when traces have been just linked with each other. As illustrated in FIG. 4, in general, a hot loop is selected as a cyclic trace, see a cyclic trace represented by a node 400. Jump destinations therefrom are sequentially compiled as subsequent traces, see a linear trace 1, a linear trace 2, and so forth represented by a node 402, a node 406, and so forth, respectively. Some nodes in the TTgraph, such as the node 406 representing the linear trace 2, have multiple incoming edges. As described above, in this embodiment, a trace is a single-entry-multiple-exit block. Thus, every incoming edge has to jump to the head of the next trace. Also, some nodes in the TTgraph, such as a node 408 representing a linear trace 3, have multiple outgoing edges. Each outgoing edge represents a transition from the exit point in the middle of the trace or at the end of the trace to the head of the next trace.

3. Updating Edge Weight

Once the basic structure of the TTgraph is generated, the TTgraph updater 221 then performs profiling using timer-based sampling during execution of compiled traces, thereby adjusting the edge weight so that the edge weight represents the relative frequency of a transition between traces. Specifically, upon finding a transition between two traces through profiling, the TTgraph updater 221 increments the weight of the edge representing the transition by 1. More specifically, the TTgraph updater 221 increments the weight of the edge between the current trace in which the timer tick has occurred and the trace executed immediately before the current trace. In the case where the node has multiple incoming edges, the TTgraph updater 221 identifies one corresponding edge by referring to the link register.

Referring to FIG. 5(a), an edge weight adjustment method will be specifically described. It is assumed that during execution of a linear trace 1, a node 502, the timer interrupt occurs, in response to which the yield flag is set and thereafter execution stops at the next trace, that is, the yield point at the head of a linear trace 2, a node 506, as illustrated in FIG. 5(a). At this time, because the previous trace is the linear trace 1, the node 502, the TTgraph updater 221 increments the weight of the edge between the node 502 representing the linear trace 1 and the node 506 representing the linear trace 2 by 1. Note that the current trace is identified from the current instruction pointer and the previous trace is identified by referring to the link register. In the case where the timer interrupt occurs during execution of a cyclic trace and execution stops at the yield point inserted at the back edge in the cyclic trace, the TTgraph updater 221 does not perform any operation because this transition is a transition to the same trace and there is no edge to be adjusted.

In order to efficiently collect samples and build a sufficiently accurate TTgraph more quickly, a known bursty tracing technique can be applied. The bursty tracing technique is a technique that enables low-overhead temporal profiling by sampling a sequence of events otherwise known as a burst, instead of one event when sampling is started, see T. Mytkowicz et al. for reference. Accordingly, also in this invention, bursty sampling derived from the bursty tracing technique, that is, sampling a sequence of consecutive transitions between traces by repeatedly stopping execution at the yield point inserted at the head of each of consecutive traces, will be discussed.

When bursty sampling is used, the TTgraph updater 221 makes a setting so that execution successively stops at yield points in one or more traces that follow the trace in which the timer tick has occurred in the TTgraph. Specifically, the TTgraph updater 221 sets the yield flag every time execution stops at a given yield point inserted at the head of a trace so as to indicate that the thread needs to stop at the next yield point.

Referring to FIG. 5(b), bursty sampling will be specifically described. It is assumed that after profiling has started, the timer interrupt occurs, in response to which the yield flag is set and thereafter execution stops at the yield point inserted at the head of a node 526 representing a linear trace 2 as illustrated in FIG. 5(b). The TTgraph updater 221 increments the weight of the corresponding edge, that is, the weight of the edge between a node 522 representing a linear trace 1 and the node 526 representing the linear trace 2, by 1, and then sets the yield flag so as to stop execution at the next yield point again. When execution stops at the yield point in the next linear trace 3, the TTgraph updater 221 performs the above-described processing again.

The TTgraph updater 221 terminates the above-described processing in response to any of (1) the execution having successively stopped a certain number of times, (2) the execution reaching any of a cyclic trace, a trace in which the execution has already stopped during bursty sampling, and a recompiled trace, and (3) the execution passing the exit point of a trace for which there is no subsequent trace. The use of such bursty sampling enables successive transitions between traces to be sampled without increasing the frequency of timer interrupts. Also, after most hot paths have been recompiled, bursty sampling processing ends because of the above condition (2) in most cases. Accordingly, in the steady state, the overhead due to bursty sampling is not so large compared with normal sampling that does not involve iterative stops.

4. Updating Recompilation Counter and Recompilation Based on TTgraph

The TTgraph updater 221 updates the recompilation counter of each node in the TTgraph in parallel with updating the weight of the corresponding edge. As described above, the recompilation counter of each node represents the frequency at which the timer tick has occurred in the trace represented by the node. Note that the frequency at which the timer tick has occurred used herein is not the frequency at which the timer tick has actually occurred in the trace but is the frequency at which it is determined that the execution time is to be charged for the trace when the timer interrupt has occurred.

In the present invention, a trace for which the execution time is to be charged is determined using the TTgraph in the following manner. Specifically, the TTgraph updater 221 sets the node corresponding to the trace in which the timer tick has occurred during execution of compiled code as the start point, traverses the edges in the TTgraph backward from the start point, and increments the recompilation counter of a trace that the backward traversal has reached when stopping in front of a cyclic trace, a recompiled trace, or an invalidated trace to be described later, or at a trace not having any further edge.

After incrementing the recompilation counter, the TTgraph updater 221 compares the value of the recompilation counter with a certain threshold S1. Upon determining that the value of the recompilation counter is greater than the certain threshold S1, the TTgraph updater 221 marks a node having this recompilation counter whose value is greater than the certain threshold S1 as invalid and deletes all the incoming and outgoing edges of this node. Upon the execution reaching the trace marked as invalid next time, the trace generator 222 is called. The trace generator 222 sets the head address of the trace marked as invalid as the start point of a new trace, permits a length greater than or equal to the certain length, and generates the new trace. The generated new trace is then output to the dynamic compiler 228 and is optimized at a high optimization level. The new trace that has been compiled is added to the TTgraph as a new node by the TTgraph generator 220. Note that the invalid mark is deleted after a certain time period has passed.

In this way, the tracing execution environment 226 according the present invention charges the execution time for an appropriate trace by using the TTgraph and finds the entire hot path. The backward traversal is not performed into a cyclic trace after the backward traversal has reached the cyclic trace because, as described above, only cyclic and linear traces are used as units for compilation in this embodiment. Thus, even when a high optimization level is set and generation of traces longer than the certain length is permitted, the backward traversal is not performed on a trace including both cyclic traces and linear traces in the TTgraph.

Figure 6:
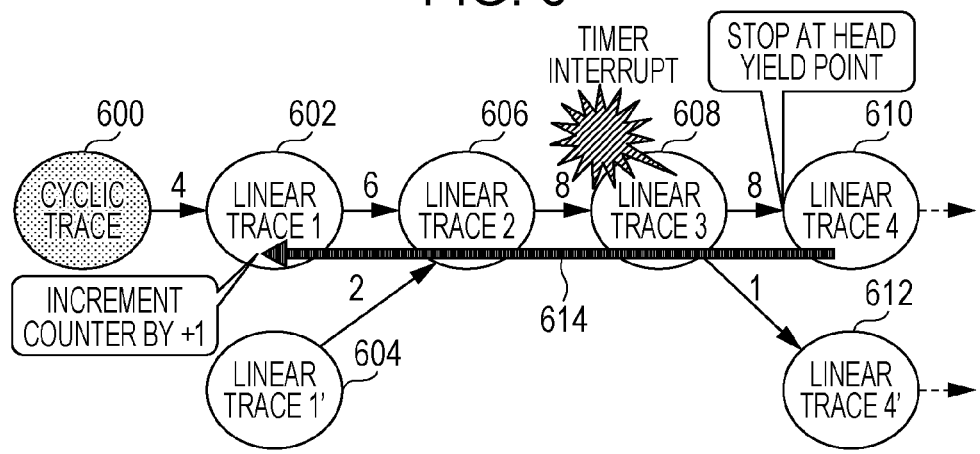
FIG. 6 is a diagram describing a method for updating a recompilation counter using a TTgraph.

FIG. 6 is a diagram describing the method for updating the recompilation counter described above. It is assumed that during execution of a linear trace 3 represented by a node 608, the timer interrupt occurs, in response to which the yield flag is set and thereafter execution stops at the yield point inserted at the head of a linear trace 4 represented by a next node 610 as illustrated in FIG. 6. In this case, because the trace in which the timer tick has occurred is the linear trace 4, the corresponding node 610 is set as the start point. As a result of traversing the TTgraph backward from the node 610 serving as the start point, see an arrow 614, the backward traversal reaches a node 602 representing a linear trace 1. Because the node 602 is a node in front of a node 600 representing a cyclic trace, the backward traversal ends at the node 602. The TTgraph updater 221 increments the recompilation counter of the node 602 by 1 to charge the execution time.

As described above, the TTgraph possibly includes a node having multiple incoming edges or multiple outgoing edges. In the case where the TTgraph updater 221 encounters a node having multiple edges while traversing the TTgraph backward, the TTgraph updater 221 traverses only an edge whose weight satisfies a certain condition. More specifically, in the case where a node encountered while traversing the TTgraph backward has multiple incoming edges, the TTgraph updater 221 traverses only an edge for which a ratio of the weight of this incoming edge to the sum of the weights of the multiple incoming edges exceeds a certain threshold S2 which is a first updating method. Also, in the case where a node to be traversed next has multiple outgoing edges, the TTgraph updater 221 traverses only an edge for which a ratio of the weight of this edge from the current node to the next node to the sum of the weights of the multiple outgoing edges exceeds a certain threshold S3, which is a second updating method. This is because the fact that the ratio of the weight of an edge of interest to the sum of the weights of multiple edges is not greater than a certain threshold indicates that this path, otherwise known as edge, is rarely executed. If there are multiple edges satisfying the condition, all the edges satisfying the condition are traversed.

Figure 7:
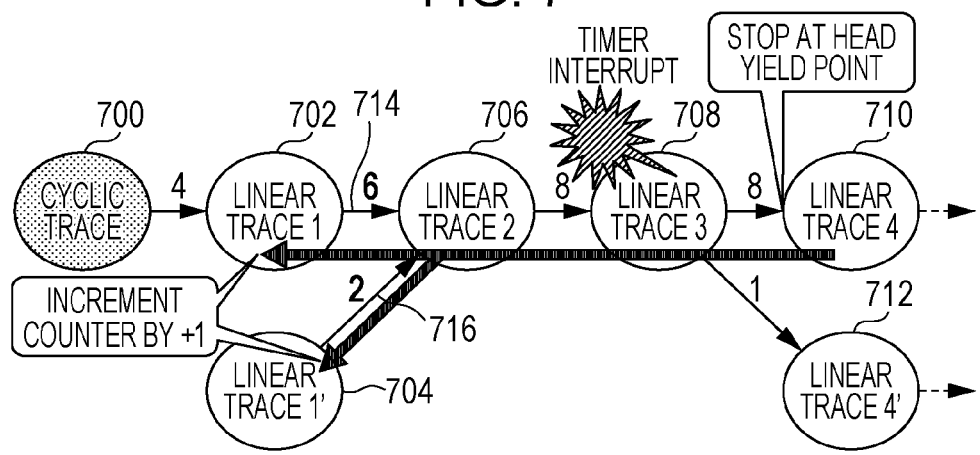
FIG. 7 is a diagram describing another method for updating a recompilation counter using a TTgraph.

FIG. 7 is a diagram describing the above-described method for updating the recompilation counter which is the first updating method. It is assumed that, during execution of a linear trace 3 represented by a node 708, the timer interrupt occurs, in response to which the yield flag is set and thereafter execution stops at the yield point inserted at the head of a linear trace 4 represented by a next node 710 as illustrated in FIG. 7. In this case, because a trace in which the timer tick has occurred is the linear trace 4, the corresponding node 710 is set as the start point. As a result of traversing the TTgraph backward from the node 710 serving as the start point, the backward traversal reaches a node 706 having two incoming edges 714 and 716.

Now suppose that the certain threshold S2 is 20% of the sum of weights of the two incoming edges 714 and 716, the sum being 8 (8=6+2). Both the weight of the incoming edge 714, which is 6, and the weight of the incoming edge 716, which is 2, exceed the 20% value. Thus, the backward traversal continues for both the incoming edges 714 and 716. As for the incoming edge 714, because a node 700 is a cyclic trace, the backward traversal ends at a node 702 located in front of the node 700. The TTgraph updater 221 increments the recompilation counter of the node 702 by 1 to charge the execution time for a linear trace 1. As for the incoming edge 716, because a node 704 has no incoming edges, the TTgraph updater 221 increments the recompilation counter of the node 704 by 1 to charge the execution time for a linear trace 1'.

Figure 8:
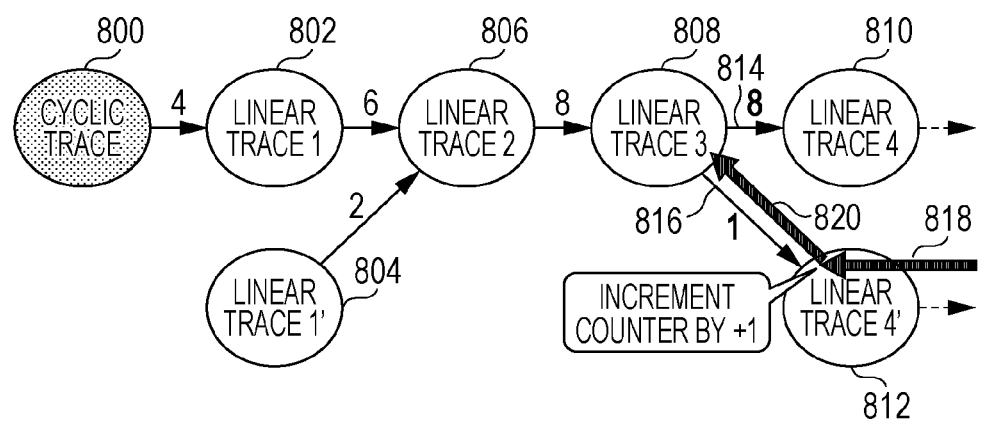
FIG. 8 is a diagram illustrating still another method for updating a recompilation counter using a TTgraph.
Figure 9:
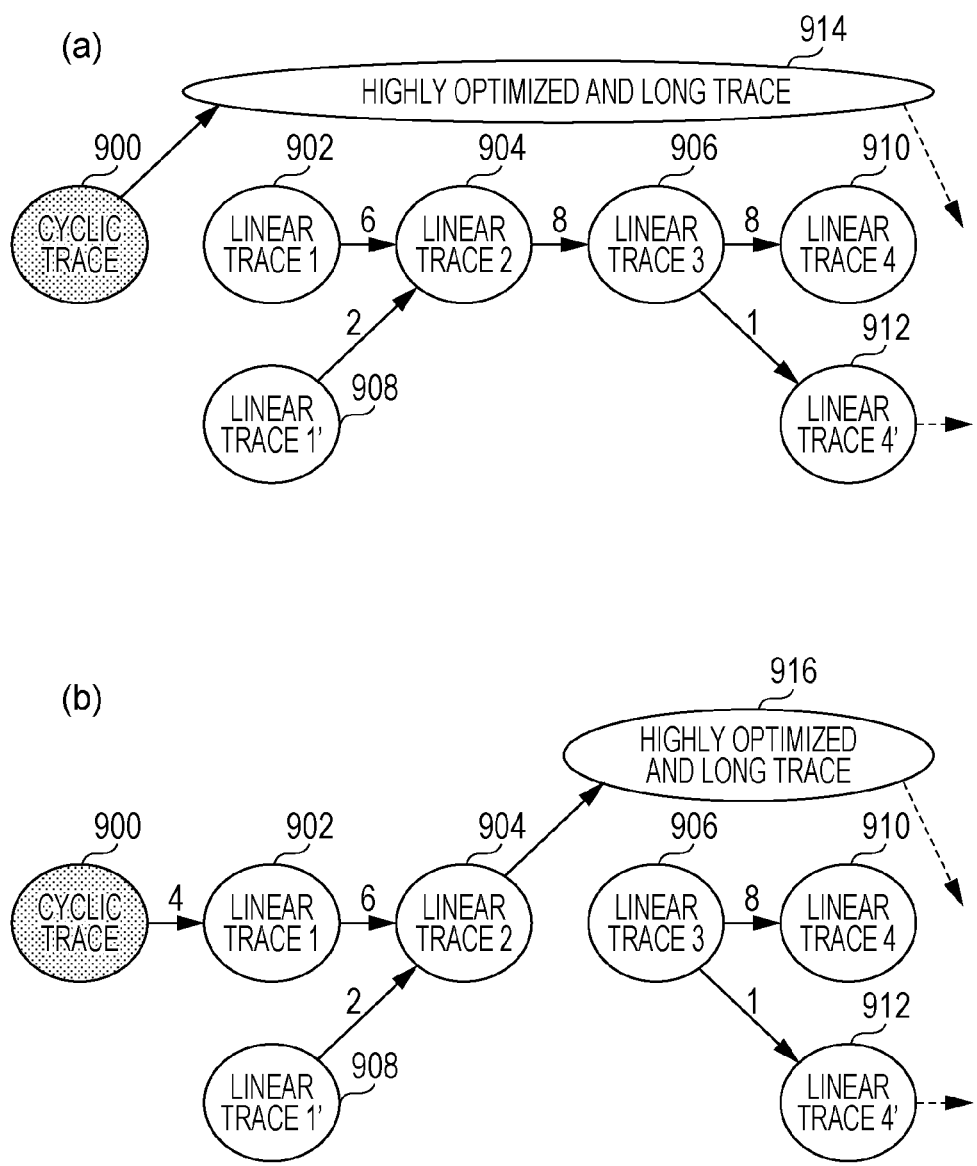
FIG. 9(a) is a diagram illustrating an example of a trace selected using a TTgraph.
FIG. 9(b) is a diagram illustrating an example of a trace selected without using a TTgraph.

FIG. 8 is a diagram describing the above-described method for updating the recompilation counter (the second updating method). It is assumed that a backward traversal is started for the TTgraph and the current node reaches a node 812 representing a linear trance 4', see an arrow 818 as illustrated in FIG. 8. A node 808 to be traversed next has multiple outgoing edges 814 and 816. The TTgraph updater 221 determines by using the weight whether or not an edge traversing condition is satisfied.

Now suppose that the certain threshold S3 is 20% of the sum of weights of the two outgoing edges 814 and 816, the sum being 9 (9=8+1). Because the weight of the outgoing edge 816, which is 1, is smaller than the 20% value, the outgoing edge 816 is not traversed. As a result, the backward traversal ends at the node 812 and the TTgraph updater 221 increments the recompilation counter of the node 812 by 1 to charge the execution time for the linear trace 4'.

FIG. 9(a) is a diagram illustrating an example of a trace that is selected using the TTgraph and is longer than the certain length. FIG. 9(b) is a diagram illustrating an example of a trace that is selected without using the TTgraph and is longer than the certain length. Note that the TTgraph illustrated in FIG. 9(b) except for a trace 916, is the same as the TTgraph illustrated in FIG. 9(a) and this is provided just for ease of understanding.

A to-be-recompiled trace 914 illustrated in FIG. 9(a) and longer than the certain length is a trace generated to have the start point appropriately selected using the TTgraph. Thus, the trace 914 includes the entire hot path. In contrast, the to-be-recompiled trace 916 illustrated in FIG. 9(b) and longer than the predetermined length is a trace generated to have the start point that is a location where the timer interrupt has occurred incidentally. Thus, the trace 916 includes only a part of the hot path. As a result, the trace 914 can be optimized while taking the entire hot path into account and better execution code can be generated. In contrast, the trace 916 does not cover the entire hot path and thus possibly misses the optimization opportunities. As for the trace 916, other long traces respectively starting from a linear trace 1 represented by a node 902 and a linear trace 2 represented by a node 904 are possibly generated newly. In such cases, excessive duplication occurs. Selecting traces by using a TTgraph in this manner enables generation of traces suitable for upgrade recompilation.

5. Description of Operation

Figure 10:
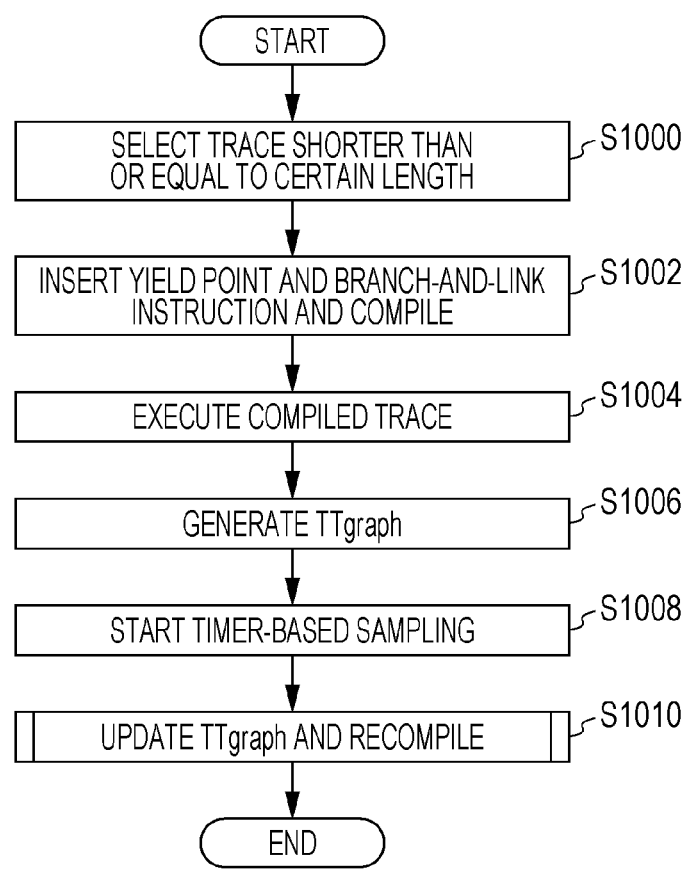
FIG. 10 is a flowchart illustrating an example of a flow of overall multi-level compilation processing according to the embodiment of the present invention.

Referring next to FIG. 10, a flow of the overall multi-level compilation processing according to the embodiment of the present invention will be described. The flowchart illustrated in FIG. 10 starts upon the virtual machine 206 launching an execution target program. Based on the program execution result obtained by the interpreter 208, the trace selection engine 218 selects frequently executed paths as traces while limiting the maximum length of traces to the certain length or shorter in step S1000. Subsequently, the dynamic compiler 228 inserts yield points in the traces output by the trace selection engine 218 and performs compilation processing at a low optimization level in step S1002.

Thereafter, the executor 212 reads out the compiled traces from the code cache 216 and executes the compiled traces in step S1004. In response to execution of the compiled traces by the executor 212, the trace selection engine 218 generates, a TTgraph which is the basic structure of in step S1006. Subsequently, the trace selection engine 218 starts profiling using timer-based sampling in step S1008. Then, the trace selection engine 218 updates the TTgraph on the basis of the profiling result, generates a new trace if a certain condition is satisfied, and outputs the new trace to the dynamic compiler 228 for recompilation in step S1010. The dynamic compiler 228 recompiles the new trace at a high optimization level. Details about the updating and recompilation processing will be described later with reference to FIGS. 11 and 12. Thereafter, the process ends.

Figure 11:
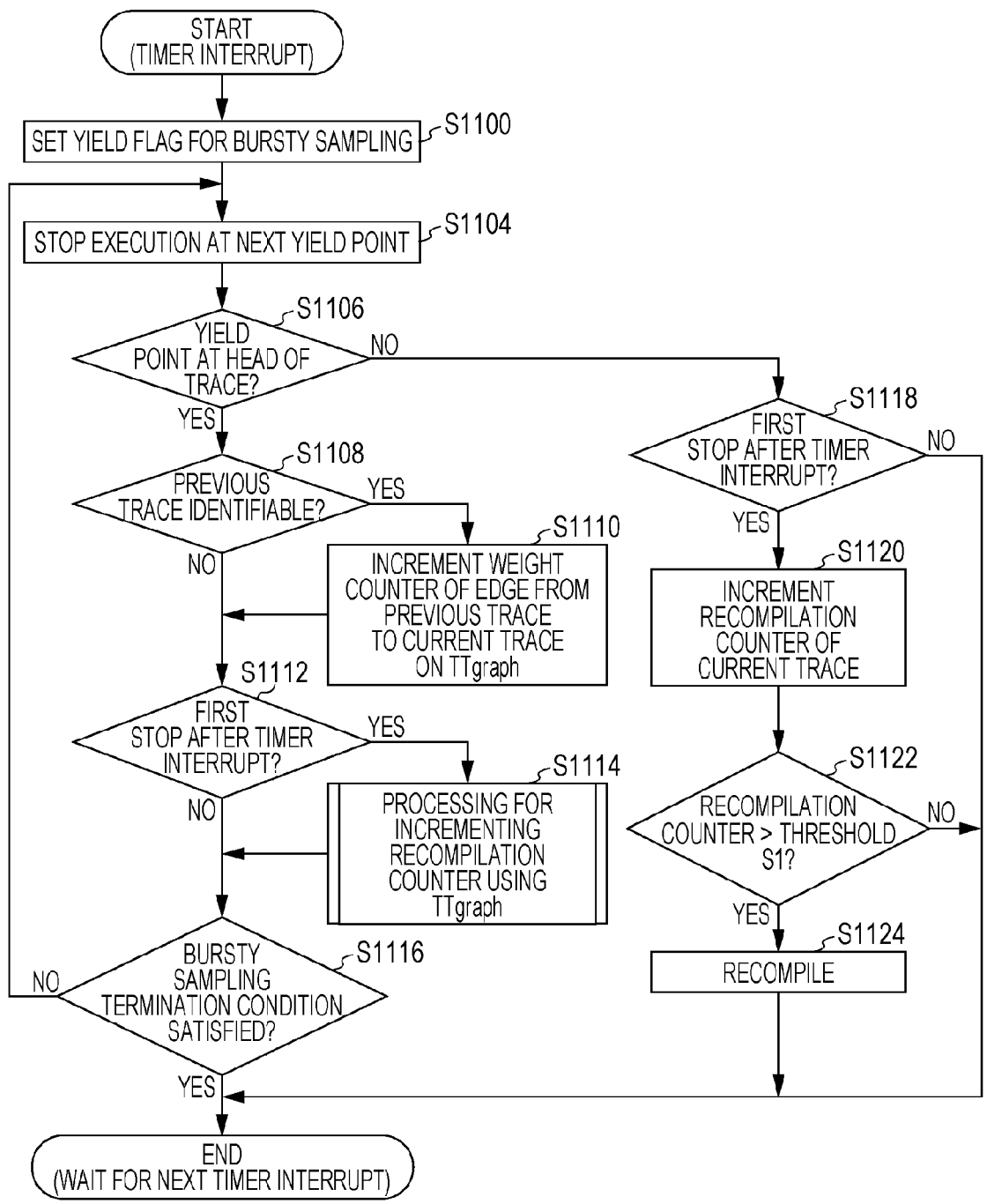
FIG. 11 is a flowchart illustrating an example of a flow of TTgraph updating processing and TTgraph-based recompilation processing.

Referring next to FIG. 11, details about the TTgraph updating processing and recompilation processing in step S1010, illustrated in FIG. 10 will be described. The flowchart illustrated in FIG. 11 starts in response to the timer interrupt. The TTgraph updater 221 sets the yield flag for bursty sampling in step S1100. In response to setting of the yield flag, the executor 212 stops execution at the next yield point in step S1104.

Subsequently, the TTgraph updater 221 determines whether or not the yield point at the stop location is a yield point inserted at the head of the trace in step S1106. If the yield point is not a yield point inserted at the head of the trace in step S1106: NO, that is, if the yield point is a yield point inserted at a back edge of a cyclic trace, the TTgraph updater 221 determines whether or not this execution stop is the first execution stop made after the timer interrupt has occurred in step S1118.

If this execution stop is the first execution stop in step S1118: YES, the TTgraph updater 221 increments the recompilation counter of the current trace, that is, a cyclic trace, by 1 in step S1120. Then, the TTgraph updater 221 determines whether or not the value of the recompilation counter of the cyclic trace is greater than the certain threshold S1 in step S1122. If the value of the recompilation counter is greater than the certain threshold S1, the trace generator 222 generates a new trace having the head address of the cyclic trace as its start point during the next execution session and the dynamic compiler 228 recompiles the new trace at a high optimization level (step S1124). Because cyclic and linear traces are handled in this embodiment, the same trace as the original cyclic trace is generated again but it should be noted that the optimization level used this time is higher than that used last time. If it is determined in step S1118 that this execution stop is not the first execution stop or if the value of the recompilation counter of the cyclic trace is not greater than the certain threshold S1 in step S1122, the process ends.

On the other hand, if the yield point at the stop location is a yield point inserted at the head of the trace in step S1106: YES, the TTgraph updater 221 determines whether or not a trace executed immediately before the current trace is identifiable by referring to the link register in step S1108. If a trace executed immediately before the current trace is identifiable in step S1108: YES, the TTgraph updater 221 increments the weight of the TTgraph edge representing a transition to the current trace from the trace executed immediately before the current trace by 1 in step S1110.

On the other hand, if a trace executed immediately before the current trace is not identifiable in step S1108: NO or after step S1110 has been performed, the process proceeds to step S1112, in which the TTgraph updater 221 determines whether or not this execution stop is the first execution stop after the timer interrupt has occurred. If this execution stop is the first execution stop in step S1112: YES, the TTgraph updater 221 performs recompilation counter incrementing processing by using the TTgraph in step S1114. Details about the recompilation counter incrementing processing will be described later with reference to FIG. 12.

On the other hand, if this execution stop is not the first execution stop after the timer interrupt has occurred in step S1112: NO, or after the recompilation counter incrementing processing has been performed, the process proceeds to step S1116, in which the TTgraph updater 221 determines whether or not a bursty sampling termination condition is satisfied. Because the content of the termination condition has already been described, description thereof is omitted here. If it is determined that the bursty sampling termination condition is not satisfied in step S1116: NO, the process returns to step S1104 and the processing sequence is repeated. On the other hand, if the bursty sampling termination condition is satisfied in step S1116: YES, or after recompilation has been performed in step S1124, the process ends.

Figure 12:
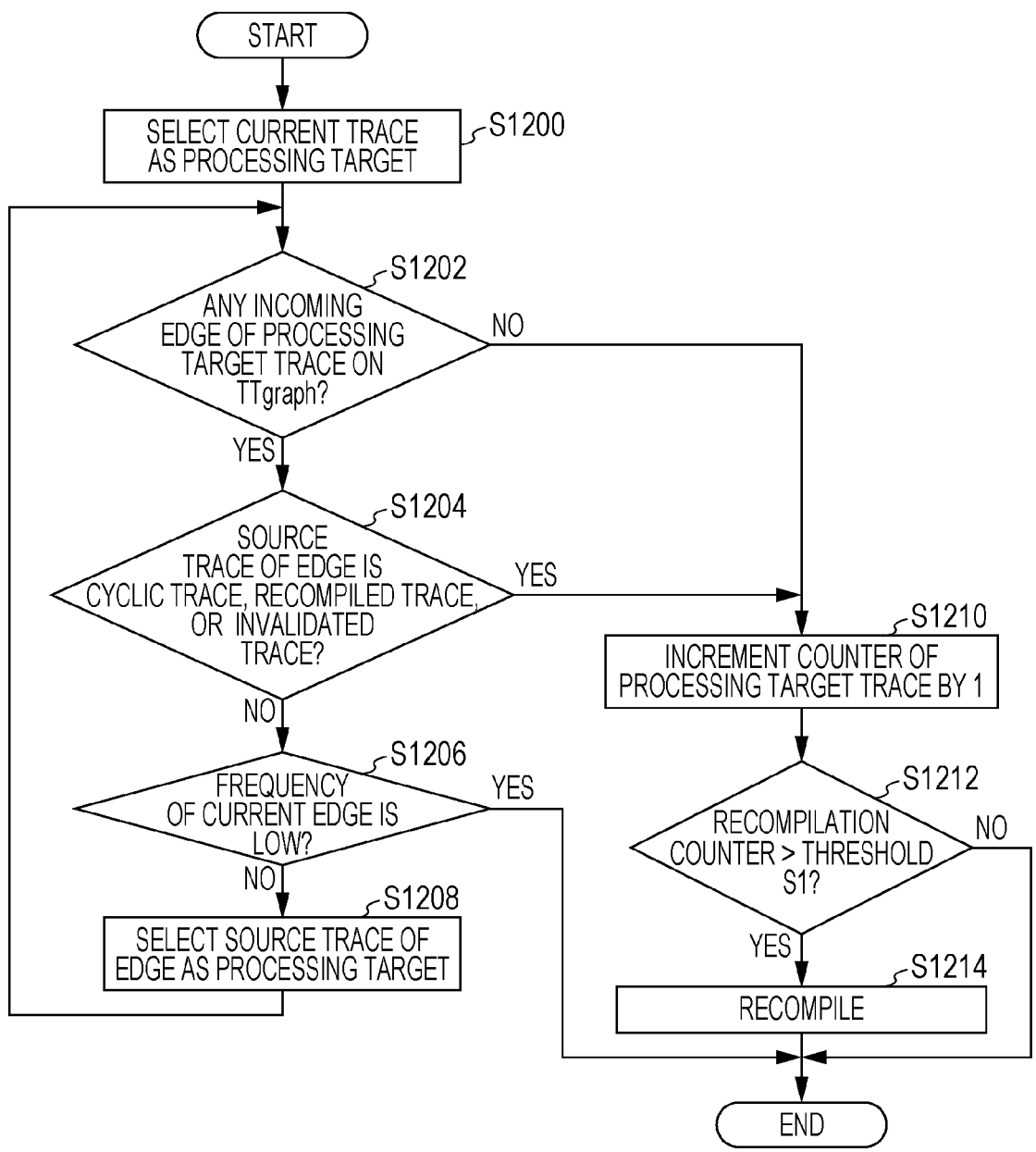
FIG. 12 is a diagram illustrating an example of a flow of recompilation counter incrementing processing using a TTgraph.

Referring next to FIG. 12, details about the recompilation counter incrementing processing in step S1114, illustrated in FIG. 11 will be described. The flowchart illustrated in FIG. 12 starts from step S1200, in which the TTgraph updater 221 sets the current trace, that is, a trace having the yield point at its head at which execution has stopped, as a current processing target. Subsequently, the TTgraph updater 221 determines whether or not the current processing target trace has an incoming edge on the TTgraph in step S1202.

If the current processing target trace has an incoming edge in step S1202: YES, the TTgraph updater 221 determines whether a source trace of the incoming edge is any of a cyclic trace, a recompiled trace, and an invalidated trace in step S1204. In the case where the current processing target trace has multiple incoming edges, processing starting from step S1204 will be performed while setting each incoming edge as the current processing target edge.

If the source trace is not any of the above three traces in step S1204: NO, the TTgraph updater 221 determines whether or not the weight of the current processing target incoming edge is small in step S1206. More specifically, in the case where the current processing target trace has multiple incoming edges, the TTgraph updater 221 determines whether or not a ratio of the weight of the current processing target edge to the sum of the weights of the multiple incoming edges is smaller than the certain threshold S2. Also, in the case where the source trace has multiple outgoing edges, the TTgraph updater 221 determines whether or not a ratio of the weight of the current processing target edge to the sum of the weights of the multiple outgoing edges is smaller than the certain threshold S3.

If the weight of the current processing target incoming edge is not small in step S1206: NO, the TTgraph updater 221 sets the source trace as the next current processing target trace in step S1208 and then the process returns to step S1202. On the other hand, if the weight of the current processing target incoming edge is small in step S1206: YES, the process ends for the current processing target incoming edge.

If the current processing target trace has no incoming edge in step S1202: NO or if the source trace is any of a cyclic trace, a recompiled trace, or an invalidated trace in step S1204: YES, the process proceeds to step S1210, in which the TTgraph updater 221 increments the recompilation counter of the current processing target trace by 1.

Subsequently, the TTgraph updater 221 determines whether or not the value of the recompilation counter of the current processing target trace is greater than the certain threshold S1 in step S1212. If the value of the recompilation counter is not greater than the certain threshold S1, the process ends. If the value of the recompilation counter is greater than the certain threshold S1, the trace generator 222 sets the head address of the current processing target trace as the start point, permits generation of a trace that is longer than the certain length, and generates a new trace during the next execution session, and the dynamic compiler 228 recompiles the new trace at a high optimization level in step S1214. Thereafter, the process ends.

FIG. 13 illustrates an example of pseudocode representing generation a TTgraph and recompilation based on the TTgraph that have been described above.

6. Results of Experiments

Performance of a trace-based JIT compiler that adopts TTgraph-based multi-level compilation according to the present invention was evaluated using the DaCapo benchmark suite. Following known techniques were used in comparison.

Known technique 1: Generation of long traces is permitted and compilation is performed at a high optimization level. Upgrade recompilation is not performed.

Known technique 2: The maximum length of traces is limited and compilation is performed at a low optimization level. Upgrade recompilation is not performed.

Known technique 3: Upgrade recompilation is performed. The restraint on the maximum length is relaxed without using the TTgraph.

Figure 14:
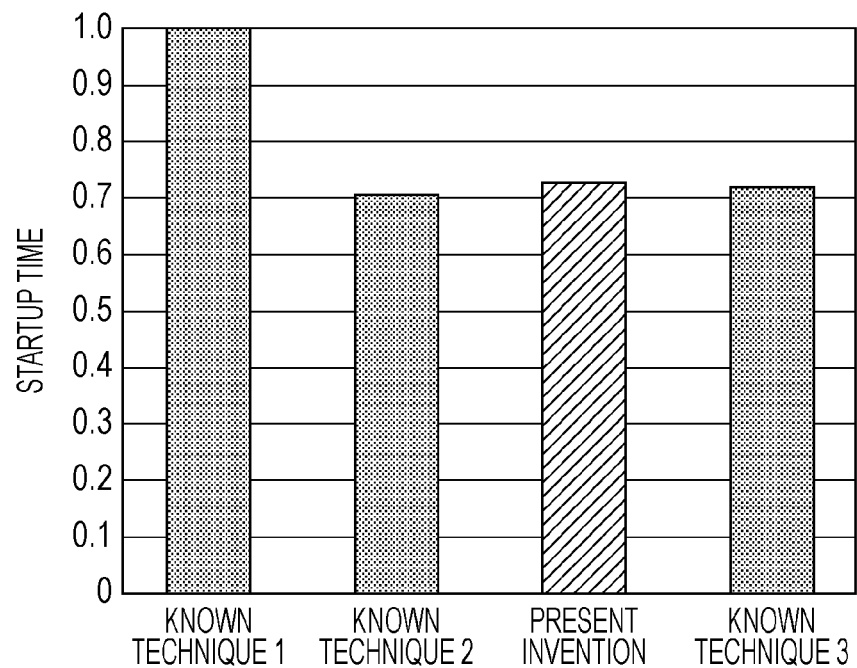
FIG. 14 is a diagram illustrating a result of an experiment in which the present invention is compared with known techniques in terms of the startup time.

FIG. 14 illustrates a result of the experiment in which the present invention is compared with the known techniques in terms of the startup time. The startup time represented by the vertical axis is the execution time of the first iteration. Also, the value illustrated in the diagram is the average of all benchmarks of the DaCapo. The startup time of the known technique 1 is long because it performs compilation at a high optimization level from the beginning. In contrast, because the remaining three techniques including the present invention perform compilation at a low optimization level during startup, the startup time is short.

Figure 15:
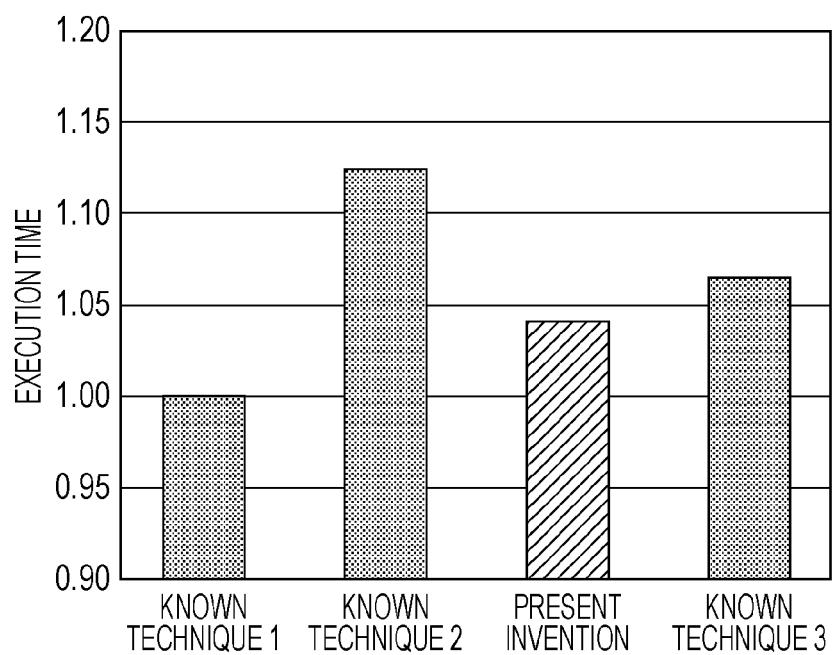
FIG. 15 is a diagram illustrating a result of an experiment in which the present invention is compared with known techniques in terms of the execution time.

FIG. 15 is a diagram illustrating a result of the experiment in which the present invention is compared with the known techniques in terms of the peak performance. The vertical axis represents the execution time. Also, the value illustrated in the diagram is the average of all benchmarks of the DaCapo. The execution time of the known technique 2 is long because it performs compilation at a low optimization level while limiting the trace length. Also, the execution time of the known technique 3, which performs upgrade recompilation, is slightly longer than that of the present invention because it does not select traces to be recompiled appropriately, and consequently misses the optimization opportunities and generates duplicated traces.

Figure 16:
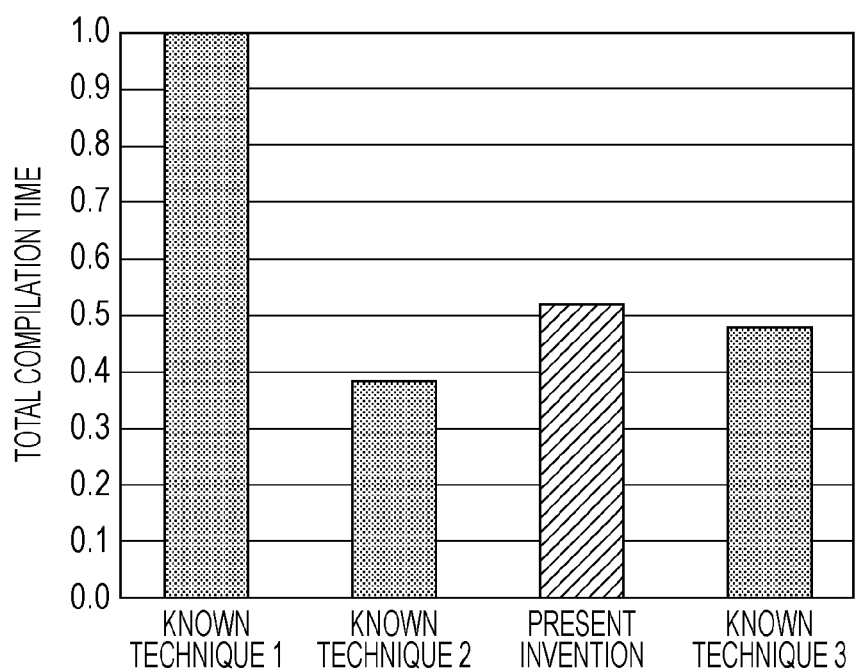
FIG. 16 is a diagram illustrating a result of an experiment in which the present invention is compared with known techniques in terms of the total compilation time.

FIG. 16 is a diagram illustrating a result of the experiment in which the present invention is compared with the known techniques in terms of the total compilation time. The vertical axis represents the total compilation time. Also, the value illustrated in the diagram is the average of all benchmarks of the DaCapo. The total compilation time of the known technique 1, which does not perform upgrade recompilation, is long because it permits generation of long traces and performs compilation at a high optimization level.

The results of the experiments illustrated in FIGS. 14 to 16 reveal that a technique that achieves both quick startup and high peak performance is the TTgraph-based multi-level compilation according to the present invention.

While the present invention has been described above through the embodiment, the technical scope of the present invention is not limited to the scope described in the above embodiment. It is obvious to those skilled in the art that various modifications and improvements can be added to the above embodiment. For example, because division into small and simple compilation units is preferable to speed up startup, traces used as units for compilation in the embodiment described above are linear and cyclic traces, each of which is a single-entry-multiple-exit block as illustrated in FIGS. 3(*a*) and 3(*b*). However, the present invention is also applicable to other traces, such as tree-like traces including branches but not including joints, traces including both cyclic traces and linear traces, and complicated traces including joints, using a similar method.

Also, in the embodiment described above, when a transition between traces occurs, a trace executed immediately before the current trace is made identifiable using the trace linking technique and the branch-and-link instruction. However, instead of using these technique and instruction, a jump source address can be stored in a specific register or memory when a jump from the current trace to the next trace is made or a transition between traces can be performed via the trace dispatcher 214 and the trace dispatcher 214 can collect the necessary information. Thus, a form with such a modification or improvement is obviously included in the technical scope of the present invention.

The invention claimed is:

1. A trace generation method implemented by a computer, comprising the steps, executed by the computer, of:
generating a directed graph in accordance with execution of compiled traces that have been obtained by compiling traces whose maximum length is limited to a certain length or shorter, the directed graph representing transitions of execution between the compiled traces, each node that represents a corresponding one of the compiled traces having a recompilation counter;
traversing edges in the directed graph backward from a start point in timer-based sampling performed during execution of the compiled traces, the start point being a node corresponding to a trace in which a timer tick has occurred, and incrementing the recompilation counter of a trace that the backward traversal has reached when stopping in front of a cyclic trace or a recompiled trace or at a trace not having any further edge;
determining the head of a trace corresponding to a node having the recompilation counter whose value exceeds a first threshold as a head of a new trace if a value of any of the recompilation counters exceeds the first threshold permitting generation of a trace that is longer than the certain length; and
generating the new trace.

2. The trace generation method according to claim 1, wherein each of the compiled traces has one or more yield points inserted at an entry point of the trace and a loop back edge, the yield points being used to find a trace in which the timer tick has occurred.

3. The trace generation method according to claim 2, wherein each of the edges in the directed graph has a weight that represents a relative frequency of a transition represented by the edge, and wherein the trace generation method further comprises the step, executed by the computer, of: incrementing the weight of an edge between a trace in which a timer tick has occurred and a trace executed immediately before the trace in which the timer tick has occurred, and wherein the traversing edges step, the computer traverses an edge whose weight satisfies a certain condition.

4. The trace generation method according to claim 3, wherein in a case where a node encountered during the backward traversal of the directed graph has a plurality of incoming edges, the edge whose weight satisfies the certain condition is an edge for which a ratio of a weight of this incoming edge to the sum of weights of the plurality of incoming edges exceeds a second threshold.

5. The trace generation method according to claim 3, wherein in the case where a node to be traversed next has a plurality of outgoing edges, the edge whose weight satisfies the certain condition is an edge for which a ratio of a weight of this outgoing edge from the current node to the next node to the sum of weights of the plurality of outgoing edges exceeds a third threshold.

6. The trace generation method according to claim 3, wherein the incrementing the weight step includes the step, executed by the computer, of making a setting for successively stopping execution at yield points inserted in one or more traces that follow a trace in which the timer tick has occurred in the directed graph.

7. The trace generation method according to claim 6, wherein the setting for successively stopping execution is disabled in response to the execution reaching any of a cyclic trace, a trace in which the execution has already stopped, and a recompiled trace, in response to the execution having successively stopped a certain number of times, or in response to the execution exiting from a trace for which there is no subsequent trace.

8. The trace generation method according to claim 3, wherein each of the compiled traces has an instruction inserted therein, the instruction being an instruction to record a pointer pointing to the instruction, execution of which triggers an exit from the compiled trace, and wherein the incrementing the weight step includes the step, executed by the computer, of in response to the execution stopping at a yield point inserted at the entry point of the next compiled trace, identifying a trace executed immediately before the next compiled trace by referring to a value of the recorded pointer pointing to the instruction.

9. A trace generation program product stored in a memory causing a computer to execute each step of the trace generation method according to claim 1.

10. A multi-level compilation execution method implemented by a computer, comprising the steps, executed by the computer, of:
compiling traces generated while limiting the maximum length of the traces to a certain length or shorter;
acquiring a result of executing the generated compiled traces; and
executing each step of the trace generation method according to claim 1 on the acquired execution result and recompiling the new trace generated as a result.

11. A multi-level compilation execution program product stored in a memory causing a computer to execute each step of the multi-level compilation execution method according to claim 10.

12. A trace generation device comprising:
a directed graph generator stored in a memory configured to generate a directed graph in accordance with execution of compiled traces that have been obtained by compiling traces whose maximum length is limited to a certain length or shorter, the directed graph representing transitions of execution between the compiled traces, each node that represents a corresponding one of the compiled traces having a recompilation counter;

a directed graph updater configured to traverse edges in the directed graph backward from a start point in timer-based sampling performed during execution of the compiled traces, the start point being a node corresponding to a trace in which a timer tick has occurred, and configured to increment the recompilation counter of a trace that the backward traversal has reached when stopping in front of a cyclic trace or a recompiled trace or at a trace not having any further edge; and a generator configured to, if a value of any of the recompilation counters exceeds a first threshold, determine the head of a trace corresponding to a node having the recompilation counter whose value exceeds the first threshold as a head of a new trace, permit generation of a trace that is longer than the certain length, and generate the new trace.

13. The trace generation device according to claim 12, wherein each of the compiled traces has one or more yield points inserted at an entry point of the trace and a loop back edge, the yield points being used to find a trace in which the timer tick has occurred.

14. The trace generation device according to claim 13, wherein each of the edges in the directed graph has a weight that represents a relative frequency of a transition represented by the edge, and wherein the directed graph updater increments the weight of an edge between a trace in which a timer tick has occurred and a trace executed immediately before the trace in which the timer tick has occurred, and traverses an edge whose weight satisfies a certain condition when traversing the edges in the directed graph backward.

15. The trace generation device according to claim 14, wherein in a case where a node encountered during the backward traversal of the directed graph has a plurality of incoming edges, the edge whose weight satisfies the certain condition is an edge for which a ratio of a weight of this incoming edge to the sum of weights of the plurality of incoming edges exceeds a second threshold.

16. The trace generation device according to claim 14, wherein in the case where a node to be traversed next has a plurality of outgoing edges, the edge whose weight satisfies the certain condition is an edge for which a ratio of a weight of this outgoing edge from the current node to the next node to the sum of weights of the plurality of outgoing edges exceeds a third threshold.

17. The trace generation device according to claim 14, wherein the directed graph updater further makes a setting for successively stopping execution at yield points inserted in one or more traces that follow a trace in which the timer tick has occurred in the directed graph.

18. The trace generation device according to claim 17, wherein the setting for successively stopping execution is disabled in response to the execution reaching any of a cyclic trace, a trace in which the execution has already stopped, and a recompiled trace, in response to the execution having successively stopped a certain number of times, or in response to the execution exiting from a trace for which there is no subsequent trace.

19. The trace generation device according to claim 14, wherein each of the compiled traces has an instruction inserted therein, the instruction being an instruction to record a pointer pointing to the instruction, execution of which triggers an exit from the compiled trace, and wherein in response to the execution stopping at a yield point inserted at the entry point of the next compiled trace, the directed graph updater identifies a trace executed immediately before the next compiled trace by referring to a value of the recorded pointer pointing to the instruction.

20. A multi-level compilation device comprising:

a compiler configured to compile traces generated while limiting the maximum length of the traces to a certain length or shorter; and the trace generation device according to claim 12, the trace generation device being configured to receive a result of executing the compiled traces, wherein the compiler recompiles the new trace output by the trace generation device.

* * * * *